United States Patent Office.

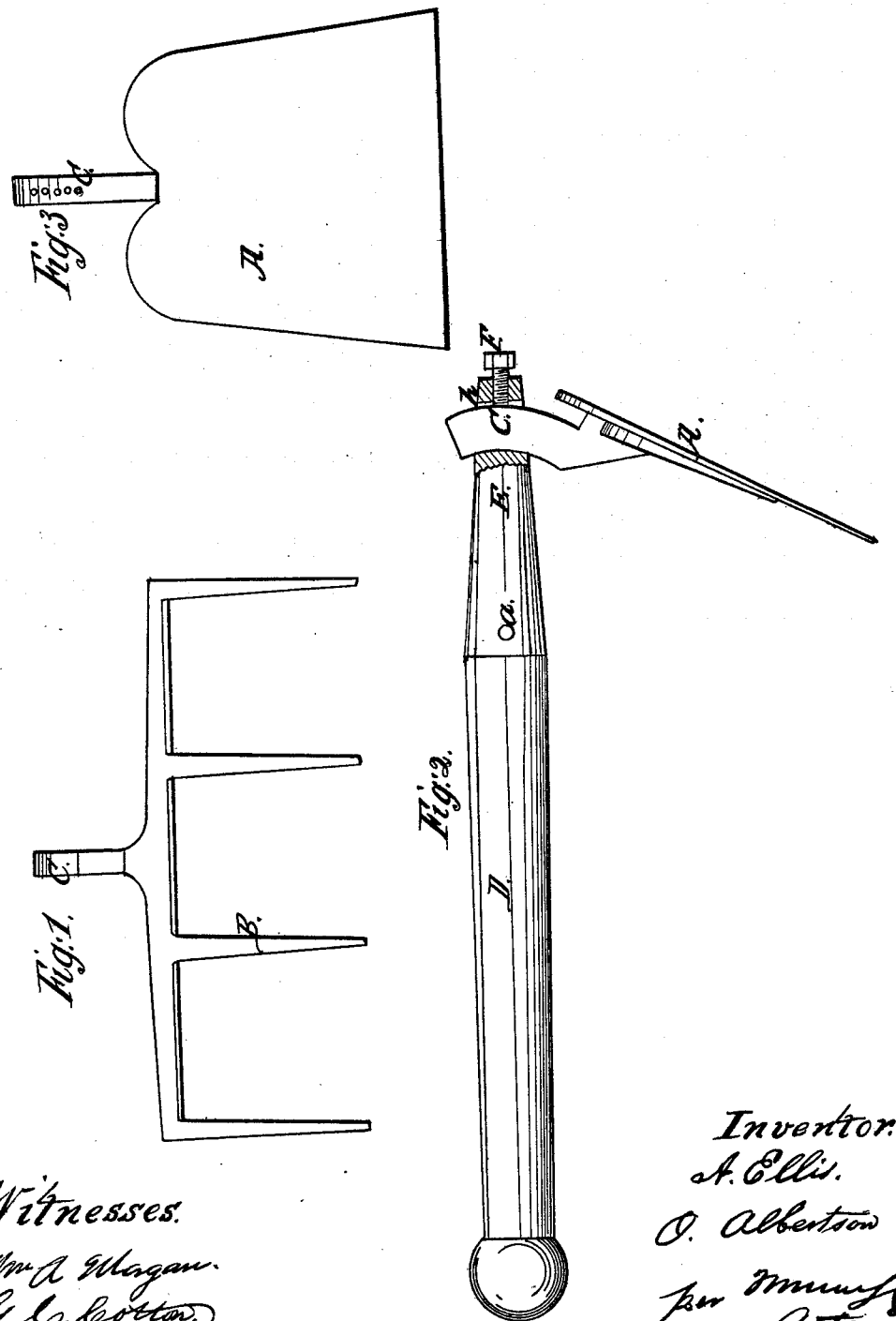

AUGUSTIN ELLIS AND OLIVER ALBERTSON, OF SALEM, INDIANA.

Letters Patent No. 91,317, dated June 15, 1869.

IMPROVEMENT IN HOES AND RAKES.

The Schedule referred to in these Letters Patent and making part of the same.

*To all whom it may concern:*

Be it known that we, AUGUSTIN ELLIS and OLIVER ALBERTSON, of Salem, in the county of Washington, and State of Indiana, have invented a new and useful Improvement in Hoes and Rakes; and we do hereby declare that the following is a full, clear, and exact description thereof, which will enable others skilled in the art to make and use the same, reference being had to the accompanying drawings, forming part of this specification, in which—

Figure 1 is a side view of our invention, with the shank partly in section.

Figure 2 is a front view of rake, pertaining to the same.

Figure 3 is a front view of a hoe, pertaining to the same.

Similar letters of reference indicate corresponding parts.

This invention relates to a new and improved manner of attaching hoes and rakes to their shanks and handles, as hereinafter fully shown and described, whereby a very firm and secure attachment is obtained, and one which will admit of the hoe or rake being set at any desired angle with the shank, or handle, and readily detached when necessary for grinding, repairs, &c.

In the accompanying sheet of drawings—

A represents a hoe, and B a rake, such as are generally used for garden implements, and each is provided with a curved tang, C, which forms a part of a circle, as shown clearly in fig. 2. This tang may be of rectangular form in its transverse section; that, at least, would be the preferable form, or as good as any.

D is a handle, which may be made of wood, as usual, and E is a metal shank, made with a socket, to receive the end of the handle, a pin, or screw, *a*, passing through the shank and handle.

The outer part of this shank, beyond the socket, is solid, and has a curved mortise, *b*, made through it, to admit of the tang C passing through it, a screw, F, passing into the end of the shank, and bearing against the tang, to hold it in position.

If necessary, the end of the screw F may be made of pointed or conical form, and the outer or convex side of the shank E may have a series of holes made in it, at equal distances apart, to receive said point of the screw. This might, in certain cases, be necessary.

It will be seen, from the above description, that the tang C may be adjusted higher up or lower down in the shank, and the hoe or rake thereby adjusted, so as to form a greater or less angle with the shank, as circumstances may require.

It will also be seen that the hoe or rake may be readily detached from the shank, for the purpose of grinding or for repairs, and also that hoes or rakes of different sizes may be attached to one and the same handle, as the nature of the work may require.

Having thus described our invention,

We claim as new, and desire to secure by Letters Patent—

The hoe or rake-head, when provided with the curved tang C and the metal socket E, secured to the handle D, when provided with the curved mortise *b*, corresponding to the curvature of the tang, and with the end set-screw F, adapted to engage with the outer convex side of the tang, by means of the recesses formed therein, as herein shown and described, for the purpose specified.

AUGUSTIN ELLIS.
OLIVER ALBERTSON.

Witnesses:
WARDER W. STEVENS,
JONAS B. BERKEY.